US007994971B2

(12) United States Patent
Velde et al.

(10) Patent No.: US 7,994,971 B2
(45) Date of Patent: Aug. 9, 2011

(54) GPS-BASED MEASUREMENT OF ROLL RATE AND ROLL ANGLE OF SPINNING PLATFORMS

(75) Inventors: Wallace Vander Velde, Winchester, MA (US); John Cafarella, Swampscott, MA (US); Huan-Wan Tseng, Westford, MA (US); George Dimos, Lexington, MA (US); Triveni Upadhyay, Concord, MA (US)

(73) Assignee: Mayflower Communications Company, Inc., Burlington, MA (US)

( * ) Notice: Subject to any disclaimer, the term of this patent is extended or adjusted under 35 U.S.C. 154(b) by 591 days.

(21) Appl. No.: 12/008,141

(22) Filed: Jan. 9, 2008

(65) Prior Publication Data
US 2010/0117894 A1 May 13, 2010

(51) Int. Cl.
*G01S 19/54* (2010.01)
(52) U.S. Cl. .................................. 342/357.37
(58) Field of Classification Search ............. 342/357.11, 342/357.36, 357.37
See application file for complete search history.

(56) References Cited

U.S. PATENT DOCUMENTS

| | | | |
|---|---|---|---|
| 5,021,792 A | 6/1991 | Hwang | |
| 5,101,356 A * | 3/1992 | Timothy et al. ............... | 701/213 |
| 5,185,610 A | 2/1993 | Ward et al. | |
| 5,296,861 A | 3/1994 | Knight | |
| 5,943,008 A | 8/1999 | Van Dusseldorp | |
| 5,990,827 A * | 11/1999 | Fan et al. ................. | 342/357.37 |
| 6,005,514 A | 12/1999 | Lightsey | |
| 6,018,315 A | 1/2000 | Ince et al. | |
| 6,023,240 A * | 2/2000 | Sutton ...................... | 342/357.11 |
| 6,128,557 A * | 10/2000 | Fenton et al. .................. | 701/13 |
| 6,154,170 A * | 11/2000 | Dentinger et al. ....... | 342/357.11 |
| 6,520,448 B1 | 2/2003 | Doty et al. | |
| 6,671,587 B2 * | 12/2003 | Hrovat et al. ..................... | 701/1 |
| 7,136,751 B2 * | 11/2006 | Pinto et al. .................... | 701/215 |
| 7,388,538 B1 * | 6/2008 | Thompson, III .......... | 342/357.11 |

OTHER PUBLICATIONS

E. Glenn Lightsey and Jared Madsen, Journal of Guidance, Control, and Dynamics, vol. 26, No. 2, pp. 304-310, Mar. Apr. 2003. All Pages.
S. Purivigraipong, Thammasat Int. J. Sc. Tech., vol. 8, No. 1, pp. 44-53, Jan.-Mar. 2003. All pages.

\* cited by examiner

*Primary Examiner* — Gregory C Issing
(74) *Attorney, Agent, or Firm* — Kaplesh Kumar

(57) ABSTRACT

A system and method for determining the roll rate and roll angle of a spinning platform, using the measured phase differences between the GPS satellite signals received on two or more antennas. The measured phase differences and the navigation solution from a GPS receiver are processed in a Kalman filter to obtain the desired information. Data from non-GPS measurement sources is optionally provided to update the navigation solution. Although of wide applicability, the invention is uniquely suited to the measurement of roll rates and roll angles of fast spinning platforms with small baselines, in which the antennas are separated from each other by distances that are a fraction of the GPS signal wavelength.

65 Claims, 14 Drawing Sheets

GPS-BASED MEASUREMENT OF ROLL RATE AND ROLL ANGLE OF SPINNING PLATFORMS

BACKGROUND OF THE INVENTION

The present invention deals generally with measurements of the roll rate and roll angle of spinning platforms, including spinning projectiles, spin stabilized spacecraft, and other such vehicles, using the signals transmitted by the satellites of the Global Positioning System (GPS).

In the context of this application, the term "roll" is understood to mean the platform's rotation about its spin axis. The words "platform," "vehicle," and "projectile" are used interchangeably in this specification and are to be interpreted as inclusive, so that the mention of one also means the mention of the others. The term GPS also is to be construed broadly, and includes not only GPS but all Global Navigation Satellite Systems (GNSS) using CDMA (Code Division Multiple Access) technology.

The focus on roll results from the fact that many projectiles aimed at a distant target do not require a full attitude reference system. If the projectile is stable under all flight conditions encountered, it may not require any stability augmentation about its two cross axes, pitch and yaw. Every guided platform, however, requires a measurement of its roll angle or roll rate, since this information helps relate the guidance commands, which are executed in the platform's body coordinates, to its location in space, which is identified in geographic coordinates.

The requirement for roll information on a guided projectile differs with the projectile configuration and its guidance concept. A fully controlled projectile is one that can correct its trajectory in both the downrange and cross-range directions. To do so, it must be able to generate lift in both the upward and lateral directions. This requires knowledge of which way is up and which way, for example, is to the right. The guidance corrections are relatively insensitive to the vehicle's elevation and traverse Euler angles, but very sensitive to its roll angle. Reasonably accurate roll angle information is required. Since the command to lift the spinning projectile in a particular geographic direction is transformed into the projectile's body coordinates for execution by its control actuators, such as aerodynamic fins, this means that a fully controlled projectile—or at least that section of it that houses the control system—cannot be spinning faster than the bandwidth of its actuators.

Other methods of making downrange corrections to the platform's trajectory include adjusting the drag on the projectile. Limited corrections of cross-range may also be achieved by adjusting the projectile spin rate, which leverages the spinning projectile's natural tendency to drift in the lateral direction. This configuration requires a relatively high spin rate, typical of gun-launched projectiles. But these corrections do not require roll angle information—only roll rate is needed. So the usual requirement of the roll estimation system is either for roll angle at relatively low spin rate or for roll rate at relatively high spin rate.

Another application requiring reliable roll angle information is a spin stabilized spacecraft, which has well-controlled spin about one axis and very little motion about the other two.

Traditional methods of measuring roll rate and angle are expensive, and can be justified only for very high value platforms. An easily implemented and cost-effective solution is required for low cost projectiles, many of which spin at very high rates (for example, 300 Hz or more). Inertial rate indicators, including MEMS (MEMS=Micro Electro Mechanical Systems) gyroscopes, are relatively expensive on this scale of costs. More importantly, they require calibration prior to use, which adds to the procurement cost. Magnetometers, likewise, are expensive, besides also being susceptible to interference from local magnetic fields, such as from on-board electromagnetic actuators and other components.

For cost-effective performance, GPS, singly or in combination with other measurement techniques, continues to be investigated for determining roll and attitude of rotating platforms. GPS carrier phase and signal strength measurements are the two main techniques used for attitude determination. The preferred technique of phase difference processing typically entails fixedly attaching an array of two or more antennas at different locations on a planar surface of the platform. The separation distances between the antennas, referred to in the art as baselines, typically exceed many wavelengths of the GPS signal. The carrier phase differences between the signals received on the antennas resulting from the spatial separations (or different pointing directions) of the antennas are exploited to determine the attitude of the vehicle.

The phase differences are related to the differences in path lengths from the GPS satellite to the antennas, and several such path length differences define the platform attitude. Since, however, the prior art baselines are typically long compared to the GPS signal wavelength, accurate counts of the number of integer wavelengths in the received signal paths are required (in addition to the fractional wavelength determinations), for calculating the true path lengths (and hence phases) of the signals reaching the respective antennas.

A single antenna fixedly attached to the platform can also be used for determining roll angle or roll rate. When the platform rotates, the GPS signal received at the single antenna shows time varying characteristics, which provides information for roll determination. The power or carrier phase of the signal received at the single antenna from the GPS satellite shows a modulation over the antenna's spin cycle, whose period is a measure of the vehicle spin rate. Also, the power of the received signal is maximum at the roll angle which orients the antenna boresight nearest to the Line of Sight (LOS) to the satellite. Since the direction to the satellite is known in Earth-fixed coordinates, this determines the roll angle of the platform.

A number of these prior art techniques using GPS signals alone have been applied to satellites and space vehicles for medium accuracy attitude determination, as low-cost alternatives to the more traditional and expensive methods employing star trackers and sun- or earth-sensors. The attitude environment of these platforms is relatively benign, since space vehicles are controlled to rotate very slowly. Even spin stabilized spacecraft typically rotate at only 1 or 2 Hz. For more dynamic applications, GPS-aided inertial attitude reference systems are employed. The inertial system accurately tracks fast and rapidly changing rotations, while GPS stabilizes the long-term bias drifts characteristic of inertial instrumentation.

The present invention nominally uses only GPS signals to measure the roll rate and roll angle of a stabilized or spinning vehicle, with standard GPS receiver hardware and special purpose processing of the received GPS signals. The customary non-GPS attitude measurement sources, such as inertial instruments (gyroscopes and accelerometers) and magnetometers, are optionally provided within this approach to augment and improve upon the navigation and roll solutions obtained purely through analysis of the GPS signal data. Although applicable to a wide range of rotating platforms with varying baselines, the present invention offers the much needed, but hitherto unavailable, cost-effective solution for measuring the roll angle and roll rate of small projectiles spinning at high rates.

The present invention maintains visibility of the GPS satellites at all roll angles, using multiple antennas disposed on the platform's body about its spin axis or near a single location along its length. For small platforms, the spacing among the antennas is necessarily small, and may be a small fraction of the GPS signal wavelength. The present invention not only computes the normal navigation solutions as to the platform's position and velocity, it also processes the received data in a unique way to produce measurements of vehicle roll angle and roll rate.

SUMMARY OF THE INVENTION

The present invention provides a low cost means of measuring the roll angle and roll rate of spinning platforms. Two or more antennas are installed on this platform, and their output signals processed through the usual RF front end of a GPS receiver.

The resulting signals serve two purposes. One permits the standard function of a GPS receiver: to track the frequency and phase of the carrier and the phase of the transmitted code for indications of pseudorange and Doppler. Similar measurements from multiple satellites help determine the instantaneous position and velocity of the vehicle. The signals received by the antennas are combined for this purpose so as to retain visibility of the satellites at all roll angles.

The other purpose for which the channel signals are used is for indicating the differences in phase between the signals received on selected pairs of the antennas. This second function enables the purpose of the present invention—to indicate platform roll rate and roll angle. The difference in carrier phase between the signals received from the same satellite on two discrete antennas, which are typically (but not necessarily always) mounted on the platform circumferentially about its spin axis and pointed in different directions, is related to the difference in path lengths from the satellite to those two antennas; that path length difference is related to the attitude of the platform to which the antennas are fixedly attached at the specified separation distance, i.e. baseline. For this phase difference measurement, each channel signal is input to a separate correlator, where each such correlator is slaved to the correlator in the navigation channel discussed above.

The channel correlators are driven synchronously, so that the correct phase difference is indicated between the channels even if phase tracking is not achieved in the GPS receiver. This is a distinction from most prior techniques, which typically measure the carrier phases of different channel signals using different independent GPS receivers. These prior art measurements provide meaningful data only if all the independent GPS receivers track carrier phase. The present invention only requires tracking of the carrier frequency, but can work with carrier phase tracking as well. At the very high roll rates of interest to the present invention, the receiver rarely achieves phase tracking due to high platform dynamics, short mission time, and intentional or unintentional interference.

An object of the present invention is to provide a GPS signal based measurement of the roll rate and roll angle of a platform using a single GPS receiver.

A second object of the present invention is to provide a GPS signal based measurement of the roll rate and roll angle of a platform where the baseline between the antennas is a fraction of the GPS wavelength.

A third object of the present invention is to provide a GPS signal based measurement of the roll rate and roll angle of a platform using multiple antennas arrayed circumferentially on the platform about its spin axis and at or near the same spin axis location.

A fourth object of the present invention is to provide GPS signal based measurements of the roll rate and roll angle of a platform at high rotation rates.

Another object of the present invention is to provide a GPS signal based measurement of the roll rate and roll angle of a platform without the aid of inertial instruments.

Still another object of the present invention is to provide a GPS signal based measurement of the roll rate and roll angle of a platform by using a filter, such as a Kalman filter or an extended Kalman filter (EKF) that includes a model of the vehicle's roll dynamics. The term "extended Kalman filter" is commonly understood to mean a dynamic filter of Kalman form, which is a linear operator, extended to apply to a non-linear problem. In the present context, the linear form of the Kalman filter is extended to accept carrier phase difference measurements that are nonlinearly related to the platform roll angle.

Yet another object of the present invention is to provide a GPS signal based measurement of the roll rate and roll angle of a platform with the roll rate and roll angle estimator formulated as an EKF having as an input the measured carrier phase differences between the satellite signals received at the different antennas.

A further object of the present invention is to provide a GPS signal based measurement of the roll rate and roll angle of a platform that also allows for the introduction of navigation or attitude data from a non-GPS measurement source, such as from an inertial sensor, magnetometer, star tracker, sun sensor, or earth sensor, for improved performance.

These and related objects of the invention are achieved in the preferred embodiment of the present invention described using the drawings herein. The drawings are primarily for illustration and must not be construed as limiting. The scope of the invention is to be limited only by the claims, and not by the drawings or description herein.

BRIEF DESCRIPTION OF THE DRAWINGS

The objects, features, and advantages of the present invention are more fully understood when considered in conjunction with the following accompanying drawings.

DETAILED DESCRIPTION OF THE INVENTION

Figure 1:
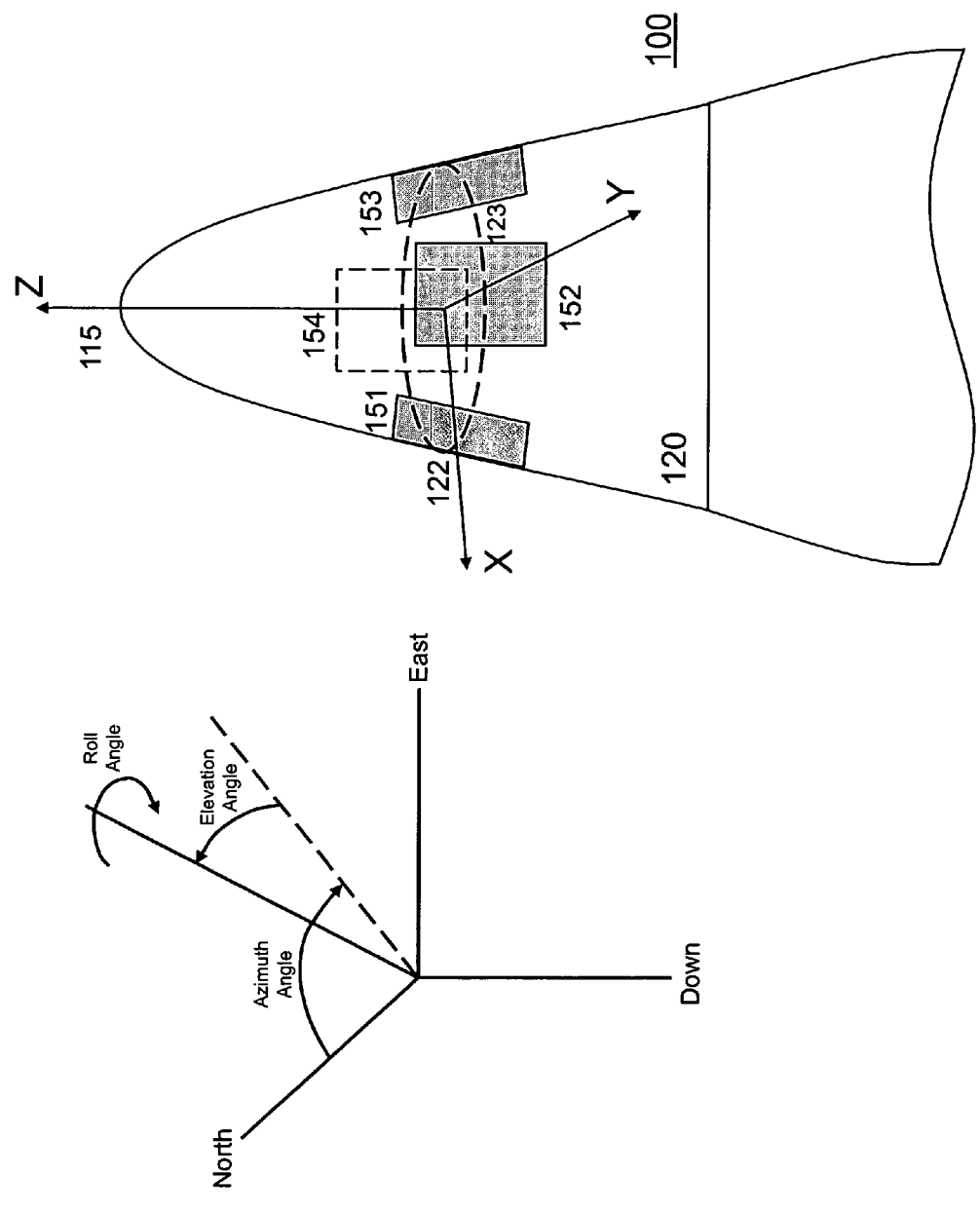
FIG. 1 shows the front end body of a notional projectile with four antennas disposed about the circumference.

FIG. 1 shows the front end body 120 of a notional projectile 100, with its four-antenna array comprising the antennas 151, 152, 153, 154 attached to the body 120 of the projectile 100. The antennas 151, 152, 153, 154 in FIG. 1 are pointed in different directions. Although this diagram is based on a four-antenna system, an antenna array comprising any multiplicity of antennas, two or greater, can be used. For a platform in the typical projectile configuration 100 shown in FIG. 1, these antennas are preferably disposed about the circumference 122 of the body 120 at a selected location 123 of its spin axis 115. For small platforms, the spacing between the antennas can be small fractions of the GPS wavelength. The orientation of the projectile 100 may be defined by a set of three Euler angles, Azimuth, Elevation and Roll (FIG. 1).

Figure 2:
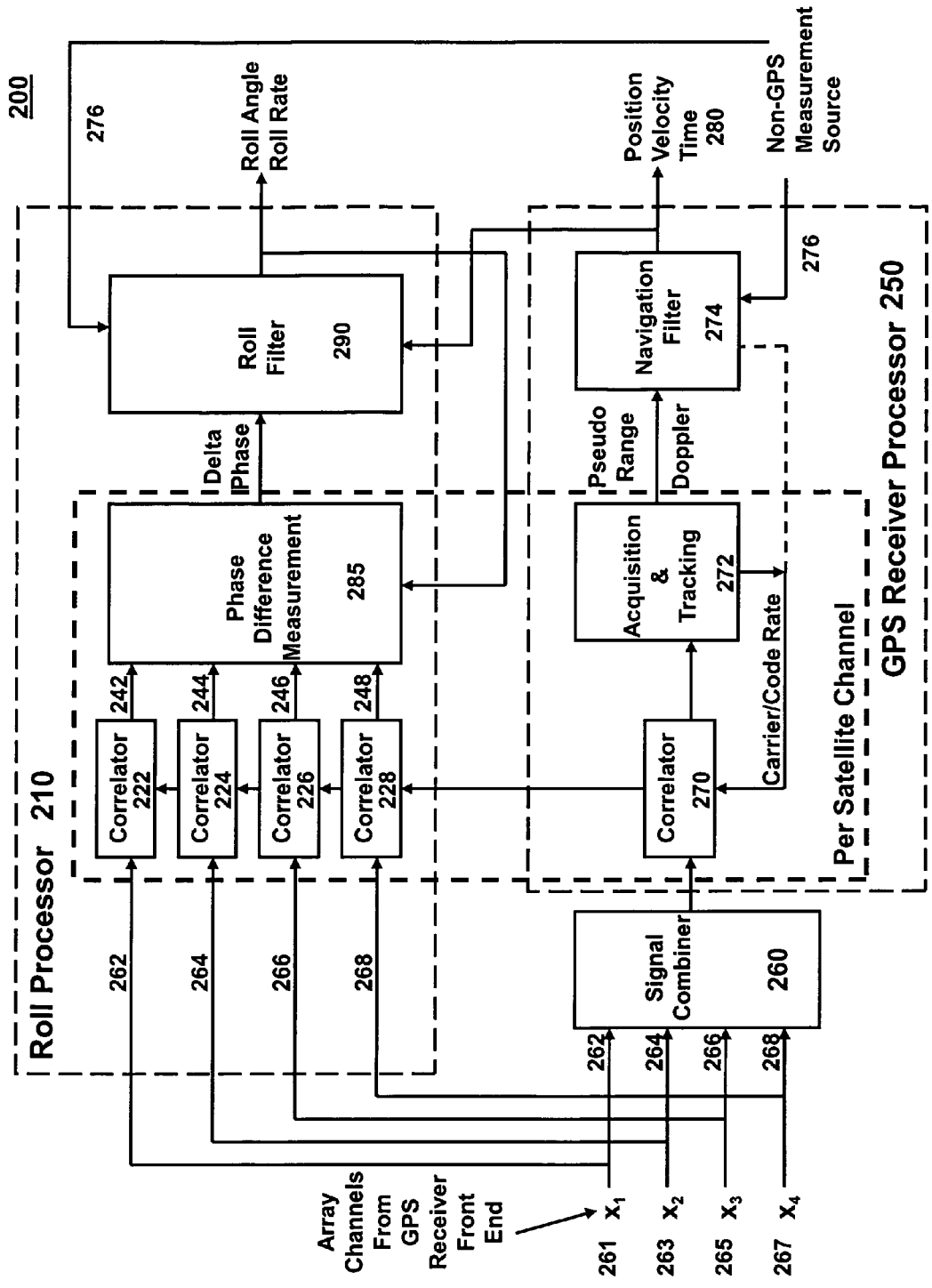
FIG. 2 represents the GPS receiver architecture of the preferred embodiment.

The preferred GPS receiver architecture 200 for a four-antenna array of the present invention is shown in FIG. 2. The standard GPS navigation function is implemented using a GPS receiver in the lower track 250 of this figure. The four antenna signals, 262, 264, 266, 268, are first combined into one in the block 260 labeled "Signal Combiner". This can be as simple as a unit-gain summer which assures that the satellites are visible at all roll angles in at least one of the antenna array channels, e.g. 261, 263, 265, 267. Or this function can be as complex as a form of jammer suppression spatial filter. The difference between these extremes lies only in the degree of computational complexity required to obtain the coefficients of the linear combination of signals, e.g. 262, 264 etc. indicated in the figure.

The usual navigation operations then follow, including carrier and code correlation 270, acquisition as well as frequency and code tracking 272, and filtering 274 of the pseudorange and Doppler measurements to produce the navigation solution 280 describing the projectile's position and velocity. For optionally updating the GPS navigation solution 280, the filter 274 may be aided using navigation data 276, if available, from a non-GPS measurement source, such as an inertial measurement unit (IMU), magnetometer, or altimeter.

The roll measurement function is implemented in the upper track 210, which is labeled in its entirety as the "Roll Processor". Each of the channel signals 262, 264, 266, 268, is correlated separately in 222, 224, 226, 228, respectively, with the correlator carrier and code driven synchronously by the GPS receiver at the same frequency that is tracked by the receiver channel in its tracking filter 272 or navigation filter 274 and used to drive its correlator 270. This assures that the signals in each of the channels 261, 263 etc. maintain the same phase relationships among themselves, both pre- and post-correlation.

These phases are advancing at some indeterminate frequency which makes them difficult to interpret. But the phase differences between any two signals are slowly varying functions of the relative phase of the satellite signal, as received on the different antennas, e.g. 152, 154 etc., and the relative phase shifts introduced by the receiver electronics within the respective channels, e.g. 261, 263 etc. The relative phases of the as-received signals depend on the relative times of arrival of the satellite signal at the respective antennas, e.g. 152, 154 etc., and any phase shifts through those antennas. The channel electronics can be calibrated, however, to account for the phase shifts within the channels, e.g. 261, 263 etc.

Figure 3:
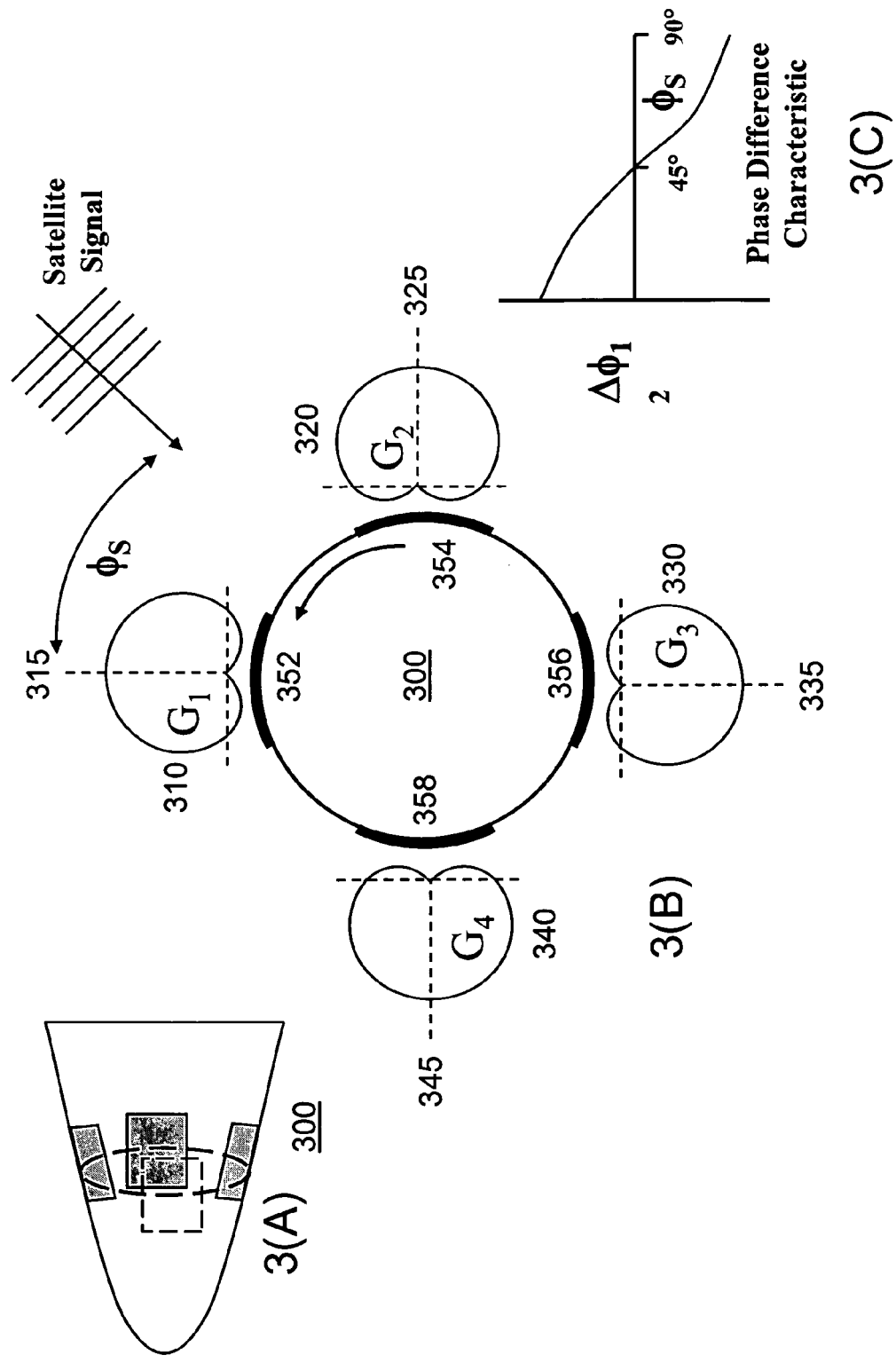
FIG. 3 depicts the geometry, receiving patterns, and phase difference characteristics of four antennas located at 90 degrees from each other around the circumference of the notional projectile.

The measured phases are functions of the geometry of the antenna's Line of Sight (LOS) to the satellite, the locations of the antennas, e.g. 152, 154 in FIG. 1 and 352, 354, 356, 358 in FIG. 3, and the beam patterns of those antennas, e.g. 310, 320, 330, 340 at the angles at which the satellite signal is received (FIG. 3). FIG. 3A shows a four-antenna array disposed circumferentially on the front end of the vehicle. Given the attitude of the vehicle, the locations of the antennas on the vehicle, and the antenna receiving patterns, the difference in phase between any two correlated signals, e.g. 242, 244, 246, and 248, can be computed 285. The phase differences computed for the signals from different pairs of the antennas provide information about the projectile's roll angle. These phase differences can be indicated in various ways familiar to those skilled in the art. As an example, and not to limit the scope of this invention, the phase difference may be determined using the relation $\Delta\phi=\tan^{-1}(a \times b^*)$ where a and b are accumulations from the outputs of the correlators in the channels being processed.

Figure 4:
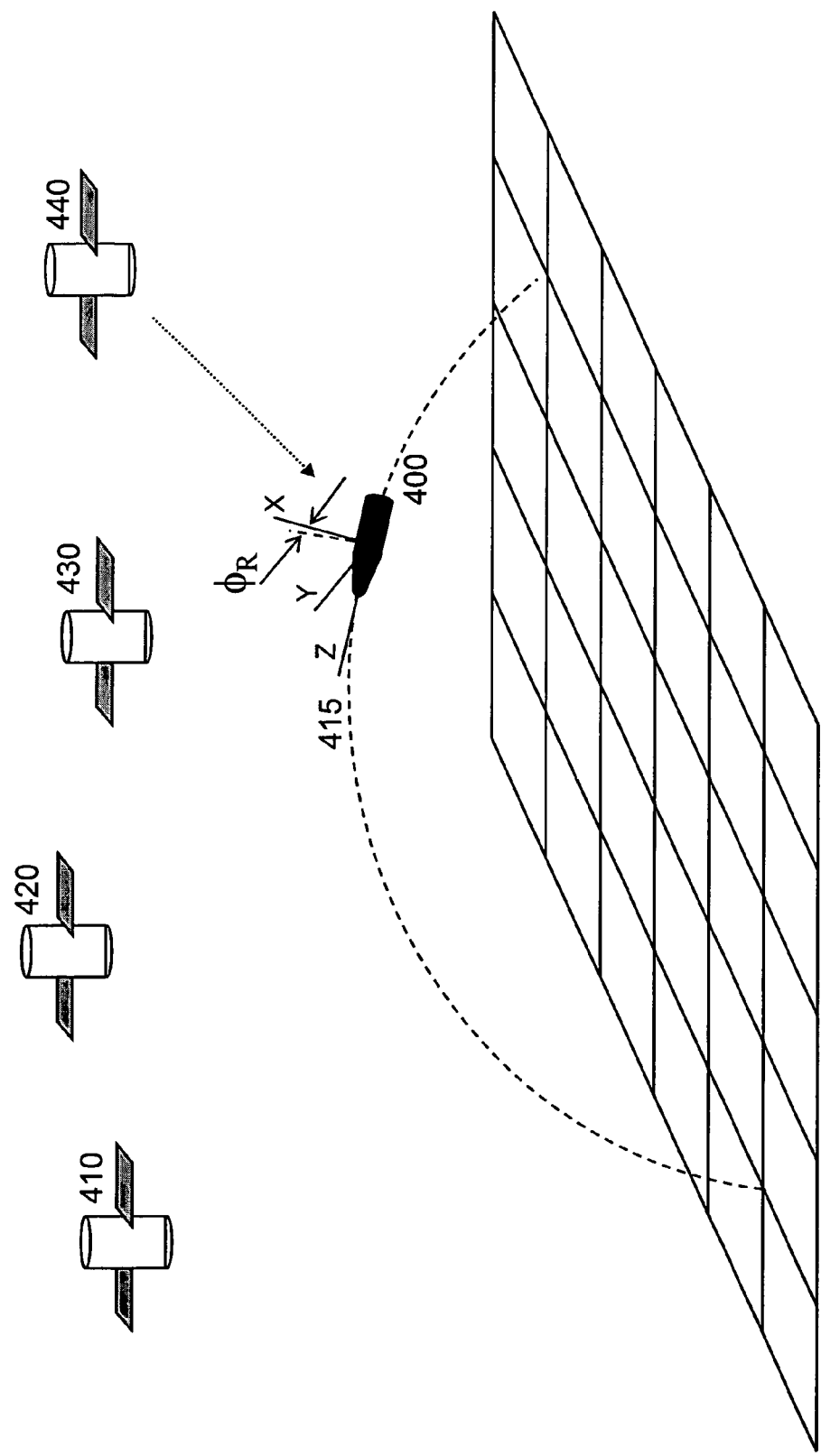
FIG. 4 presents a typical operational scenario.

For this calculation, the GPS navigation solution establishes the position and velocity of the vehicle 400 in the GPS Earth Centered Earth Fixed (ECEF) coordinate frame (FIG. 4). The position of the satellite is given in the same frame by the GPS ephemeris data. This helps define the direction of the LOS to the satellite being tracked. The orientation of the vehicle 400 is defined by the set of three Euler angles shown in FIG. 1: Azimuth, Elevation and Roll. This is not a limitation since any set of attitude parameters that define the transformation can be used—including other sets of Euler angles, such as Elevation, Traverse and Roll, or four quaternion parameters, etc.

Where there is no other source of attitude information, the projectile's angle of attack can be approximated as small. Under this assumption, the longitudinal axis 415 of the projectile 400 is closely aligned with the projectile's velocity vector, which is known from the GPS navigation solution. This helps determine the elevation and azimuth angles.

The third Euler angle, roll, is determined by the present invention. (Although, generally, the platform's roll rate and roll angle measurement is performed with respect to any axis about which the platform spins, in this example the roll rate and roll angle measurement with respect to the Euler roll angle provides the required attitude information, since the projectile's longitudinal translation axis is aligned with its spin axis.) For any given estimate of the roll angle, the phase difference between any two channel signals can be predicted. The discrepancy between the measured phase difference versus that predicted is ascribed to error in the estimate of the roll angle, providing the basis for correcting that estimate. The estimation of the roll angle from the measured channel phase differences is performed in the Roll filter 290, which in this illustration is implemented as an extended Kalman filter (EKF). (FIG. 2.) The EKF filter formulation used in the preferred embodiment of the present invention yields an estimate of roll rate as well as roll angle.

It will be obvious to the person skilled in the art that this Roll filter function can be performed as well by filters of other forms including fixed-gain filters. It is also possible to modify the foregoing formulation to use a linear Kalman filter rather than an extended form of that filter. This can be achieved by inverting the nonlinear relation between roll angle and phase difference to infer a roll angle corresponding to each measured phase difference, and then applying the derived roll measurement as an input to a linear Kalman filter. All such other filter formulations obvious to those skilled in the art are within the scope of the present invention.

Where, in addition to the GPS-based method described here, the application provides platform attitude information from other non-GPS measurement sources as well, such as from a set of rate gyros, a magnetometer (which senses the Earth's magnetic field), a star tracker, or earth and sun sensors, a convenient way to integrate these disparate sources is to treat them all as providing measurements to be processed in the Roll Filter 290. The EKF integrates all the available data into the best possible information about vehicle roll angle and roll rate. With adequate monitoring of the quality of the input data, the filter 290 continues to do the best it can with whatever data it receives when some of the GPS or non-GPS measurement sources fail to provide an input for any reason. This function of the Roll Filter 290 is included in the present invention. The entire chain of functions just described: synchronous carrier and code correlation of the individual channel signals, measurement of the differences of their carrier phases, and estimation of the platform roll rate and roll angle by the Roll Filter, are functions ascribed to the Roll Processor.

A common, but not exclusive, operational scenario is illustrated in FIG. 4. It assumes that a GPS receiver on board the projectile 400 is tracking all the satellites in view, e.g. 410, 420, 430, 440, and producing the GPS navigation solution 280 of position and velocity. One or more of the satellites, e.g. 410, 420 etc., is chosen, based on its favorable geometry, for roll angle processing. The zero angle of attack approximation provides a fix on the projectile's elevation and azimuth angles, which determine the projectile's orientation except for roll angle, which is estimated in the Roll filter 290. The basis for roll estimation is the EKF processing of the measured phase differences between the signals on adjacent channels If the four antenna gain patterns 310, 320, 330, 340 shown in FIG. 3(B) are symmetric about their boresight lines e.g. 315, 325, 335, 345, a satellite signal arriving from the direction midway between the directions of the boresight lines e.g. 315, 325 of the two antennas, e.g. 352, 354 facing the satellite, will be received on those antennas with equal phase. If the projectile roll angle is varied within some range about that initial value, the phase of the signal in one channel, e.g. 261, will increase and that in the other channel, e.g. 263, will decrease. This will result in the phase difference variation between them as shown in FIG. 3(C). For the range shown, the phase difference between the signals in the receiving channels corresponding to the antennas 352 and 354 provides a useful measurement for roll angle estimation. As the projectile rolls further in the positive direction (i.e. counter-clockwise, as viewed in the figure) the satellite LOS departs from the useful region for antenna 352 and enters the useful region for antenna 356. Then the phase difference of the signals in the channels corresponding to antennas 354 and 356 provides the useful measurement to process in the EKF for roll estimation.

Figure 5:
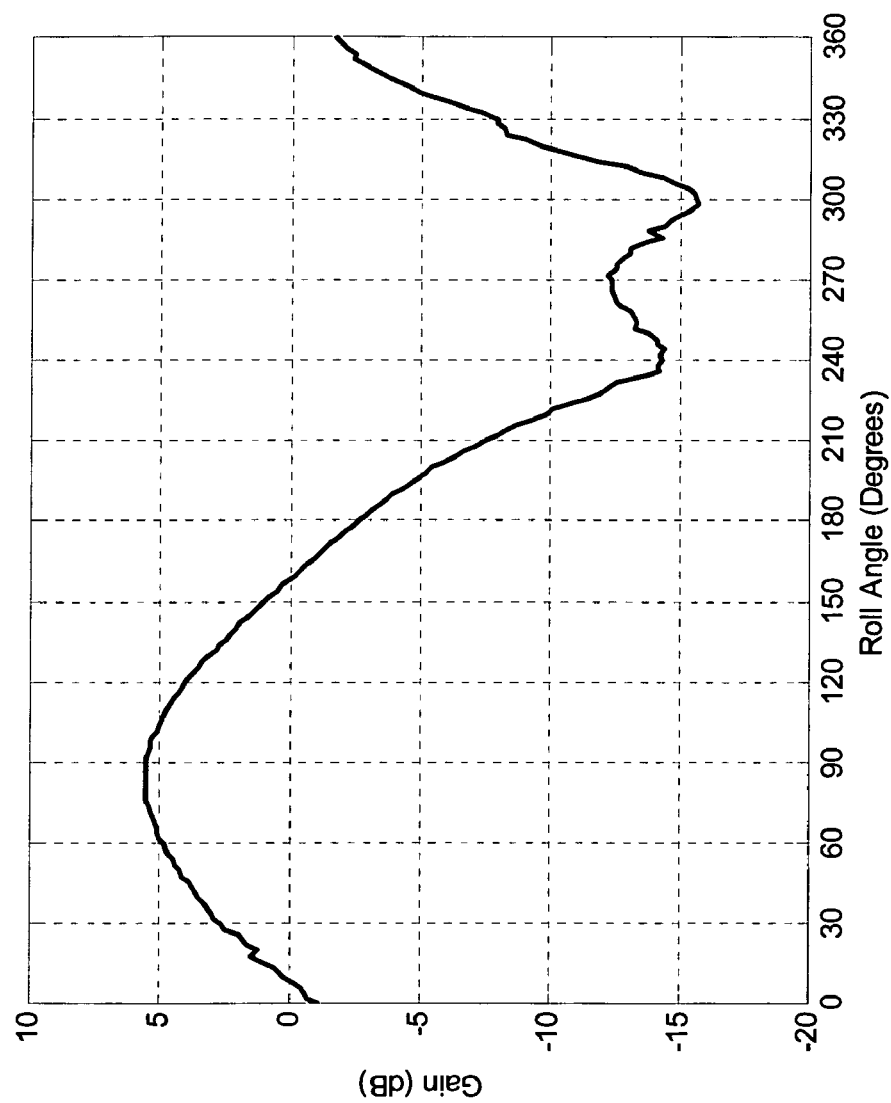
FIG. 5 shows the receiving gain pattern of antenna 152 in the XY plane.
Figure 6:
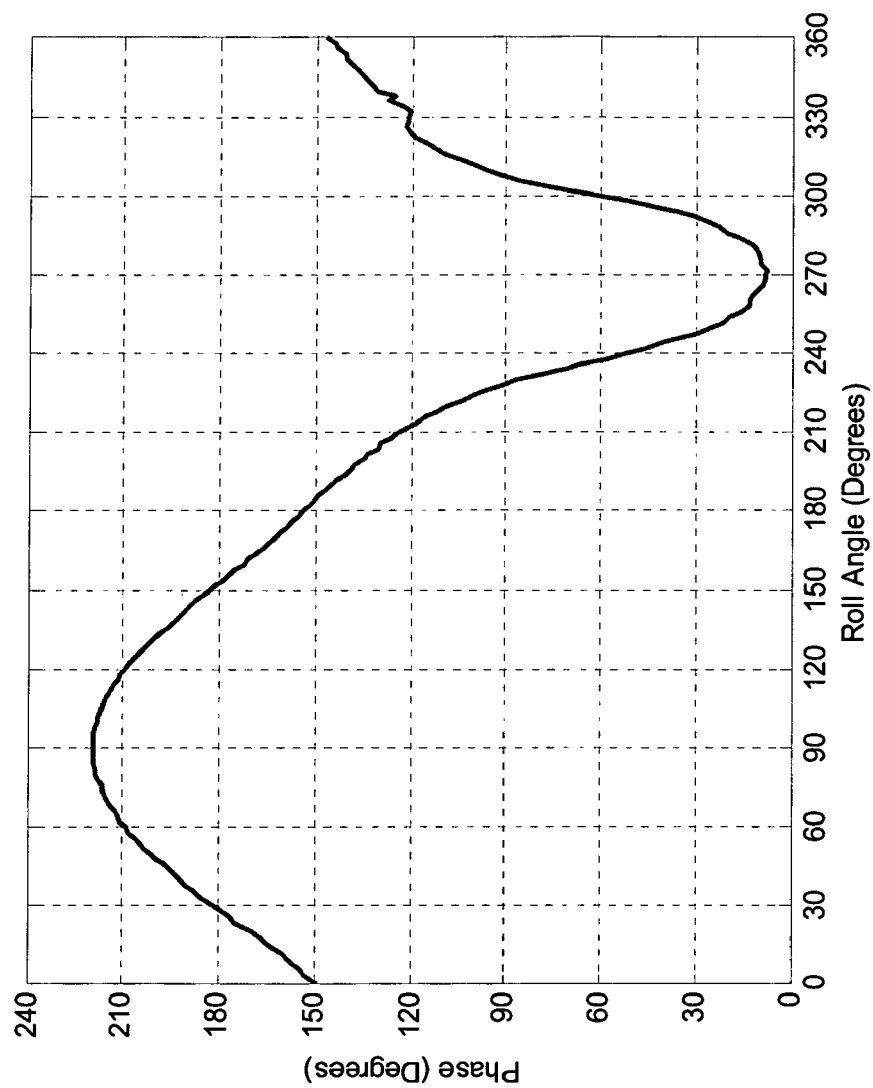
FIG. 6 shows the receiving phase pattern of antenna 152 in the XY plane.
Figure 7:
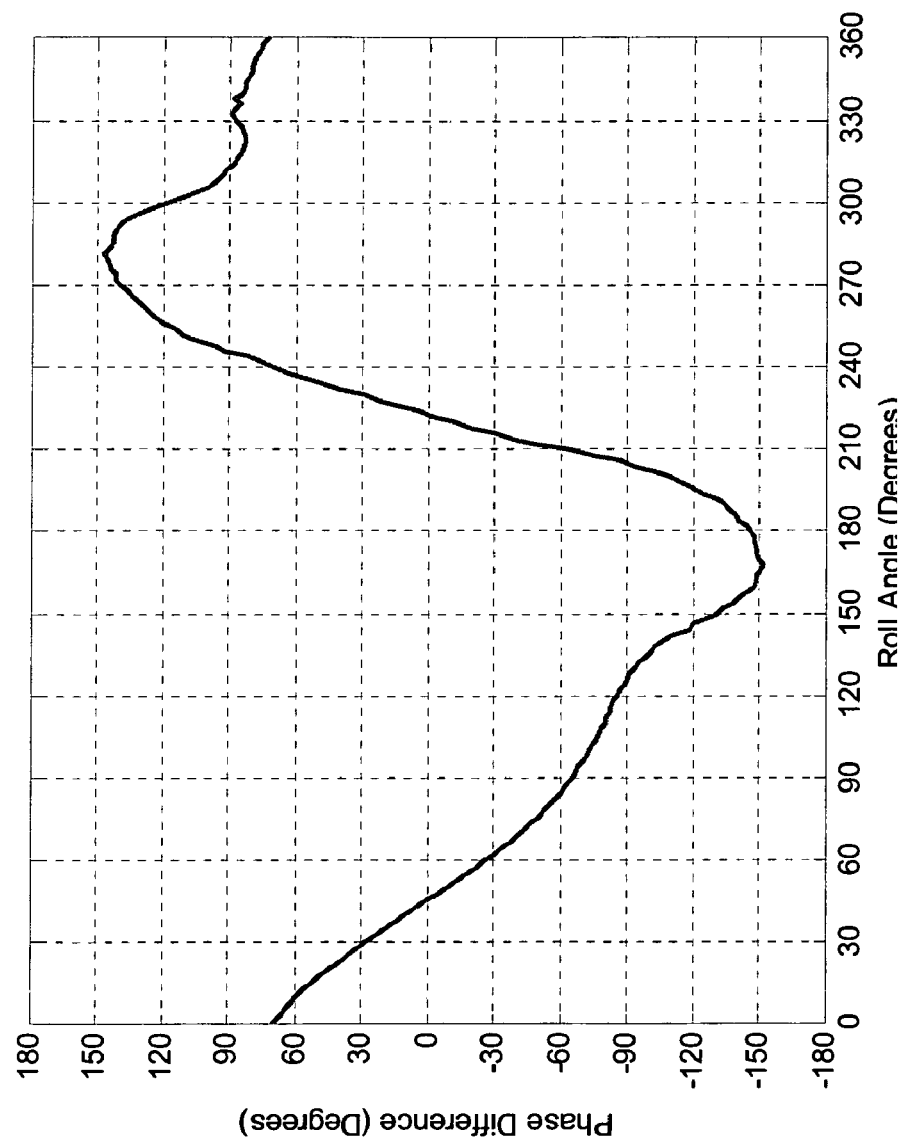
FIG. 7 shows the phase difference between antennas 151 and 152 in the XY plane.
Figure 8:
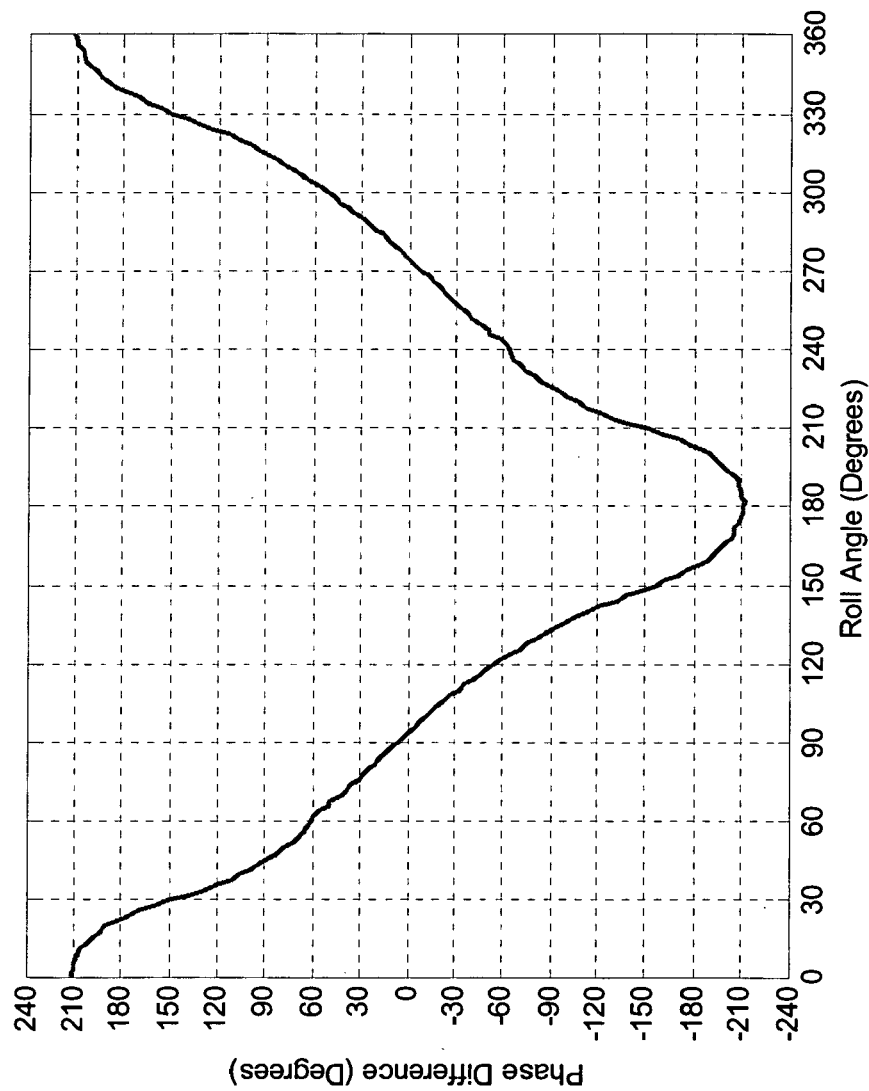
FIG. 8 shows the phase difference between antennas 151 and 153 in the XY plane.

The receiving pattern characteristics of the antennas, e.g. 352, 354 etc., on the projectile, e.g. 300, determine the strength and phase rotation of the received signals. Since roll estimation depends on the phase relationships between the received signals, the number of antennas, antenna array configuration, and antenna gain patterns strongly influence roll estimation performance. As an example, for the four antenna array and coordinate system of FIG. 1, FIGS. 5 and 6 show the gain and phase patterns, respectively, of antenna 152 in the XY plane. FIGS. 7 and 8, on the other hand, respectively depict the phase differences between pairs of antennas in the XY plane that are separated by angles of 90° (151 and 152) and 180° (151 and 153). These phase differences depend on the orientation and separation of the antennas.

In FIGS. 5 and 6, the signal source faces antenna 152 directly on boresight when it has roll angle of 90°. For a significant range around that point, the antenna gain is high and the phase is smoothly varying. These characteristics define a useful range of the antenna for roll attitude processing. In FIG. 7, which corresponds to the four antenna array, the useful range for the pair of antennas is roughly between 0° and 90° roll angle, where the delta phase (i.e. phase difference) variation is almost linear. With the direction of the LOS to the satellite nearly constant, the roll of the LOS as seen in body coordinates depends directly on platform roll angle. In FIG. 8, which corresponds to a two-antenna array, the nearly linear useful range is roughly from 60° to 120° roll angle, and on the opposite side, from 240° to 300° roll angle. These variations are attenuated and become less useful as the LOS to the source, i.e. the satellite, moves out of the XY plane toward the nose or tail of the projectile.

As discussed, the Roll filter 290 for estimating roll rate and roll angle based on measurement of delta phase between adjacent channel signals is preferably an extended Kalman filter (EKF). Table 1 displays the extended discrete time Kalman filter vector measurement formulation for the roll rate and roll angle indication of a spinning platform. The filter 290 operates by cycling between Time Propagation and Measurement Update steps. The filter state vector x contains the roll angle $\phi_R$ (in cycles) and roll rate $\dot{\phi}_R$ (in Hz) as state variables. The filter Time Propagation is based on the following model for the filter state dynamics:

$$\frac{d}{dt}\phi_R = \dot{\phi}_R$$

$$\frac{d}{dt}\dot{\phi}_R = -\frac{1}{\tau}\dot{\phi}_R + a_c + n(t)$$

where $\frac{1}{\tau}\dot{\phi}_R$ represents roll damping, $a_c$ represents roll acceleration due to control action, and
$n(t)$ represents white noise in roll acceleration.

The rate of change of roll rate includes a roll damping term which is negligibly small in many cases, and a control action roll acceleration term which is provided by the platform control system. If the control system issues a command which affects the roll rate, this roll acceleration term assists the Roll Filter 290 by anticipating the change. The uncertainty in our representation of roll acceleration is represented in the above model as a white noise process. This white noise representation prevents the filter gain from converging to zero and losing the ability to track a changing roll rate. Inclusion of the roll acceleration as a filter state variable can further enhance the ability to track a changing roll rate. The second order model of roll dynamics given here is illustrative only and is not meant to limit the scope of this invention. Any order of model can be used, according to the nature of the application, and all are within the scope of the present invention.

The meanings of the parameters in the equations in Table 1 are as follows:

$\Phi$ is the state transition matrix relating state vector $\hat{x}_k^+$ at time step k after measurement update to state vector $\hat{x}_{k+1}^-$ at time step k+1 before measurement update;

N is the power density of white noise n(t). It is used as a design parameter to tune the filter operation to the expected level of roll dynamic activity;

T is the time between filter updates;

$\hat{x}^-$ and $P^-$ are the state estimate vector and error covariance matrix at the present time, prior to incorporating the present measurement. They result from the preceding Time Propagation step;

$\hat{x}^+$ and $P^+$ are the state estimate vector and error covariance matrix at the present time after incorporating the present measurement. They are the initial conditions for the next Time Propagation step;

H is the linearized measurement sensitivity matrix $$\left(\frac{\partial m}{\partial x}\right).$$

It is a function of $\underline{x}$
and is evaluated at $\hat{x}^-$;

K is the Kalman gain matrix;

R is the measurement noise covariance matrix;

$\tilde{m}$ is the actual measurement;

$\phi_i$ is the phase of the signal in channel i;

$m(\hat{x}^-)$ is the predicted measurement function based on the prior estimate of $\underline{x}$; and I is the identity matrix.

The vector form of measurement update is used if all the available phase difference measurements, $\Delta\phi_{ji}=\phi_j-\phi_i$, are processed in one step. In view of the fact that the number of these measurements available will change from time to time, and thus the dimensions of m, H, K, and R will change, it is convenient to process the available measurements one at a time, and repeat the update process as many times as the phase difference measurements are made.

Table 2 shows the extended discrete time Kalman filter scalar measurement formulation, which provides the flexibility of using any number of available phase difference measurements. The number of measurements to be processed will depend on the number of satellites used for roll processing. The parameters used in this scalar formulation are as follows:

$$\underline{h} = \begin{bmatrix} \frac{\partial \Delta\phi_{ji}}{\partial \phi_R} \\ 0 \end{bmatrix} = \begin{bmatrix} \frac{\Delta\phi_{ji}(\hat{\phi}_R^- + \delta\phi_R) - \Delta\phi_{ji}(\hat{\phi}_R^- + \delta\phi_R)}{2\delta\phi_R} \\ 0 \end{bmatrix}$$

is the linearized measurement sensitivity vector;

k is the Kalman gain vector; and r is the measurement noise variance (a scalar).

TABLE 1

Extended Kalman filter vector measurement formulation for roll rate and roll angle indication of spinning platforms.

Time Propagate $$\hat{\underline{x}}_{k+1}^- = \underline{\underline{\Phi}} \cdot \hat{\underline{x}}_k^+$$

$$\underline{\underline{P}}_{k+1}^- = \underline{\underline{\Phi}} \cdot \underline{\underline{P}}_k^+ \cdot \underline{\underline{\Phi}}^T + \begin{bmatrix} \frac{1}{3}NT^3 & \frac{1}{2}NT^2 \\ \frac{1}{2}NT^2 & NT \end{bmatrix}$$

$$\underline{\underline{\Phi}} = \begin{bmatrix} 1 & T \\ 0 & 1 \end{bmatrix}$$

Filter State $$\underline{x} = \begin{bmatrix} \phi_R \\ \dot{\phi}_R \end{bmatrix}$$

Measurement Update $$\underline{\underline{K}} = \underline{\underline{P}}^- \underline{\underline{H}}^T (\underline{\underline{H}} \underline{\underline{P}}^- \underline{\underline{H}}^T + \underline{\underline{R}})^{-1}$$

$$\hat{\underline{x}}^+ = \hat{\underline{x}}^- + \underline{\underline{K}} \cdot [\tilde{\underline{m}} - m(\hat{\underline{x}}^-)]$$

$$\underline{\underline{P}}^+ = (\underline{\underline{I}} - \underline{\underline{K}} \underline{\underline{H}}) \cdot \underline{\underline{P}}^-$$

Measurements $$\tilde{\underline{m}} = \begin{bmatrix} \phi_1 - \phi_2 \\ \phi_2 - \phi_3 \\ \phi_3 - \phi_4 \\ \phi_4 - \phi_1 \end{bmatrix}$$

$$\underline{\underline{H}} = \frac{\partial \underline{m}}{\partial \underline{x}}$$

$$\underline{\underline{R}} = [\phi_{Ni,i+1} \phi_{Nj,j+1}]$$

TABLE 2

Extended Kalman filter scalar measurement formulation for roll rate and roll angle indication of spinning platforms.

Time Propagate $$\hat{\underline{x}}_{k+1}^- = \underline{\underline{\Phi}} \cdot \hat{\underline{x}}_k^+$$

$$\underline{\underline{P}}_{k+1}^- = \underline{\underline{\Phi}} \cdot \underline{\underline{P}}_k^+ \cdot \underline{\underline{\Phi}}^T + \begin{bmatrix} \frac{1}{3}NT^3 & \frac{1}{2}NT^2 \\ \frac{1}{2}NT^2 & NT \end{bmatrix}$$

$$\underline{\underline{\Phi}} = \begin{bmatrix} 1 & T \\ 0 & 1 \end{bmatrix}$$

Filter State $$\underline{x} = \begin{bmatrix} \phi_R \\ \dot{\phi}_R \end{bmatrix}$$

Measurement Update $$\underline{f} = \underline{\underline{P}}^- \cdot \underline{h}$$

$$\underline{k} = \frac{1}{\underline{h}^T \cdot \underline{f} + r} \cdot \underline{f}$$

TABLE 2-continued

Extended Kalman filter scalar measurement formulation for roll rate and roll angle indication of spinning platforms.

$$\hat{x}^+ = \hat{x}^- + k \cdot [\tilde{m} - m(\hat{x}^-)]$$
$$\underline{P}^+ = \underline{P}^- - k \cdot \underline{f}^T$$

Measurements $$\tilde{m} = \Delta\phi_{ji} = \phi_j - \phi_i$$
$$r = \frac{\text{scaling\_factor}}{\sqrt{|Mag_i| \cdot |Mag_j|}}$$

The parameter r was defined above as the variance of the noise on the measurement being processed. Here, the interpretation of r is generalized to indicate the degree to which each measurement is emphasized. It was previously shown with respect to FIG. 3 how the utility of each delta phase measurement increases and decreases over the cycle of platform roll. The filter formulation in Table 2 recognizes this by modulating a fixed scaling factor inversely with the geometric mean of the magnitudes of the antenna gain patterns, e.g. 310, 320 etc., of the two channels participating in each measurement. This results in a larger filter gain for the measurement being processed, based on the antenna elements, e.g. 352, 354 etc., most nearly facing the satellite. In addition, the sensitivity of delta phase to platform roll angle decreases with the out-of-roll-plane angle of the LOS to the satellite. This effect also is recognized by adjusting the filter parameter r. In effect the measurement noise-to-signal ratio increases as the LOS approaches the platform longitudinal axis—and the value of r is increased to reflect this.

The results of several simulation experiments for roll estimation are presented below. Each of these cases considers a four-antenna array, 151, 152, 153, 154, with the antennas mounted at 90° intervals around the circumference, e.g. 122, of a spinning platform 100. Because the received GPS signal is at least 19 dB below the ambient thermal noise, and the front-end electronics contribute noise to the received signal, it is essential to design the signal processing flow to gain as much Signal-to-Noise ratio (S/N) as possible.

While enlarging the coherent integration time interval increases the post correlation signal-to-noise ratio, a long integration time also smears the phase difference measurements because of the spinning platform's continuously changing roll angle. The roll filter 290 response can be controlled by the design parameters such as N, which is the power density of white noise n(t), T, which is the time between filter updates, and r, which is the measurement noise variance as shown in Table 2. These parameters can be designed to match the roll dynamics.

Figure 9:
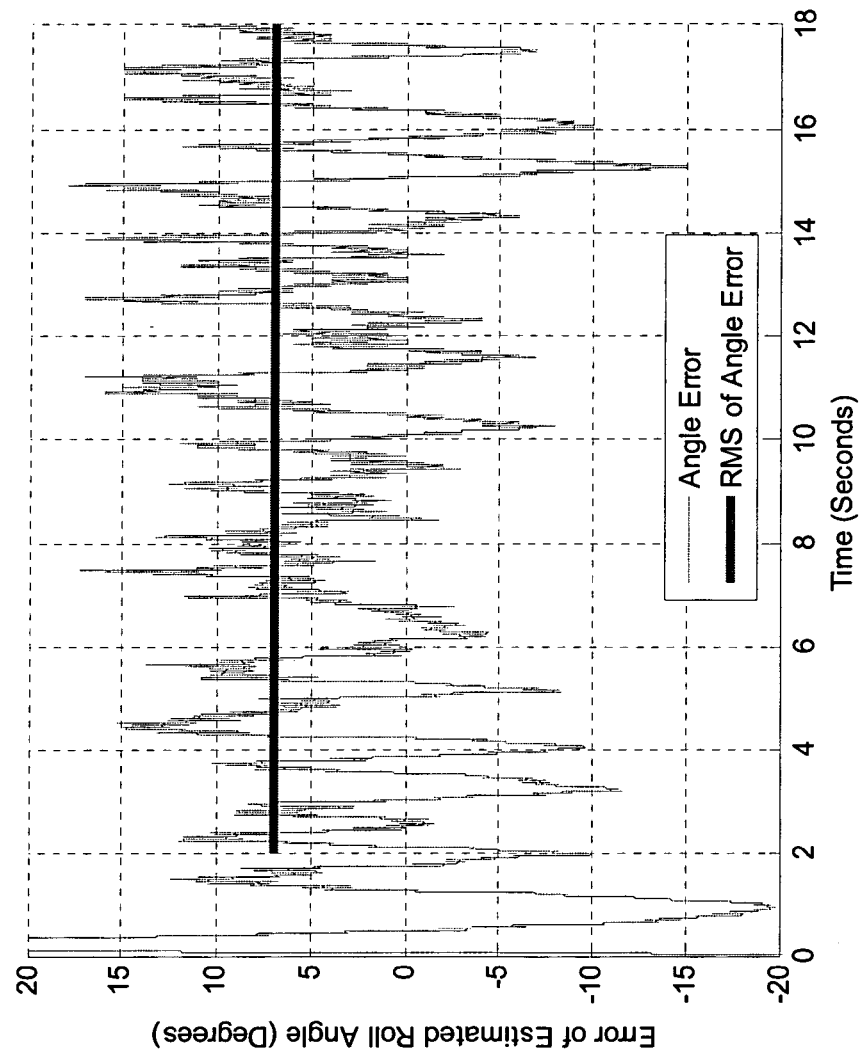
FIG. 9 presents the error in estimated roll angle for a four-antenna array, where the satellite is in the XY plane, the true roll rate is 300 Hz, and the simulation includes ambient thermal noise and 3-dB system noise.
Figure 10:
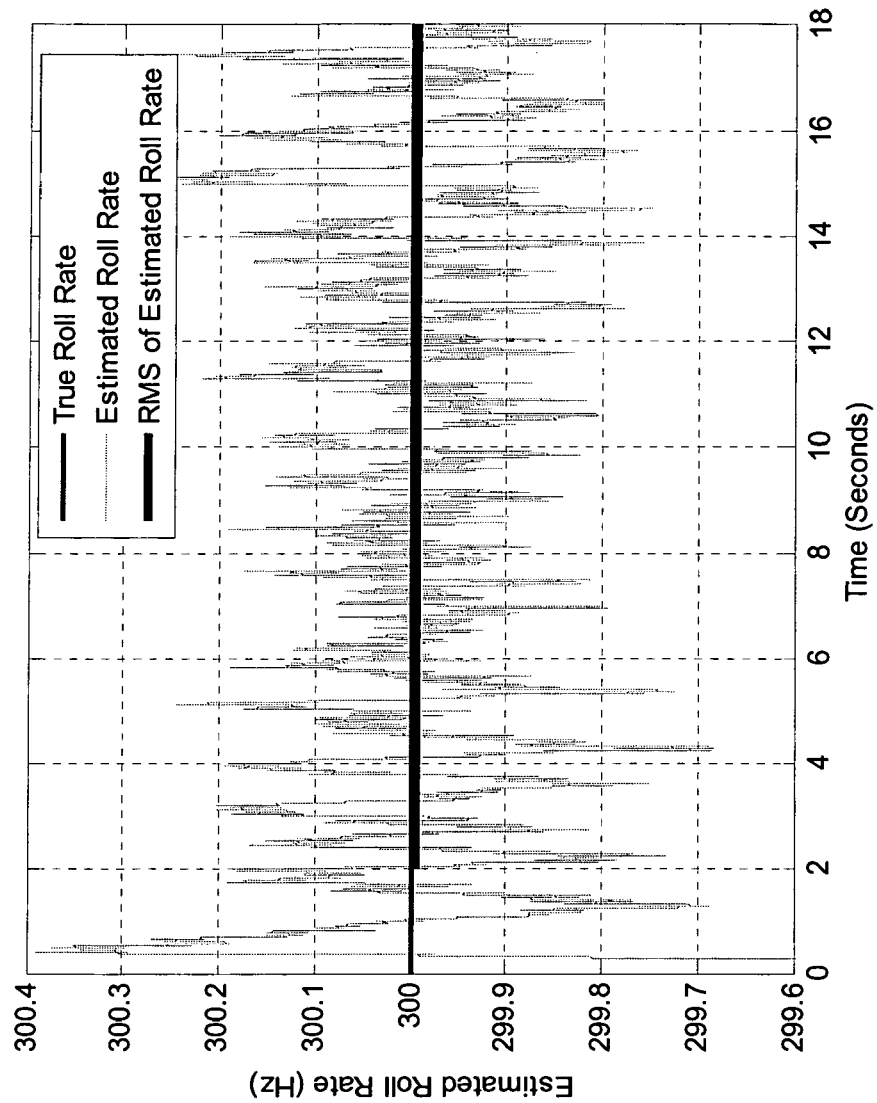
FIG. 10 presents the estimated roll rate for a four-antenna array, where the satellite is in the XY plane, the true roll rate is 300 Hz, and the simulation includes ambient thermal noise and 3-dB system noise.

FIGS. 9 and 10 respectively show the errors in estimated roll angle (i.e. the deviations of the estimated values of the roll angle from their true values) and the estimated roll rate for a projectile spinning at 300 Hz. The satellite is assumed to be in the XY plane, i.e. the roll plane. The thermal noise is taken to be 19 dB above the GPS Coarse Acquisition (C/A) code signal, and the system noise figure is assumed to be 3 dB. The sampling rate is set at 31.87 MHz, and the IF frequency is set at −1.375 MHz for the C/A code signal. The bandwidth of the signal filter is assumed to be 27 MHz. The coherent integration time interval is 700 microseconds, and the EKF update interval is 100 microseconds (i.e. 10 KHz). As shown in these figures, the estimated roll angle is typically within ±15° of its true value; the rms error after the initial transient is 7.01°. The estimated roll rate is generally within ±0.3 Hz of the true roll rate; the rms error after the initial transient is 0.1 Hz.

Figure 11:
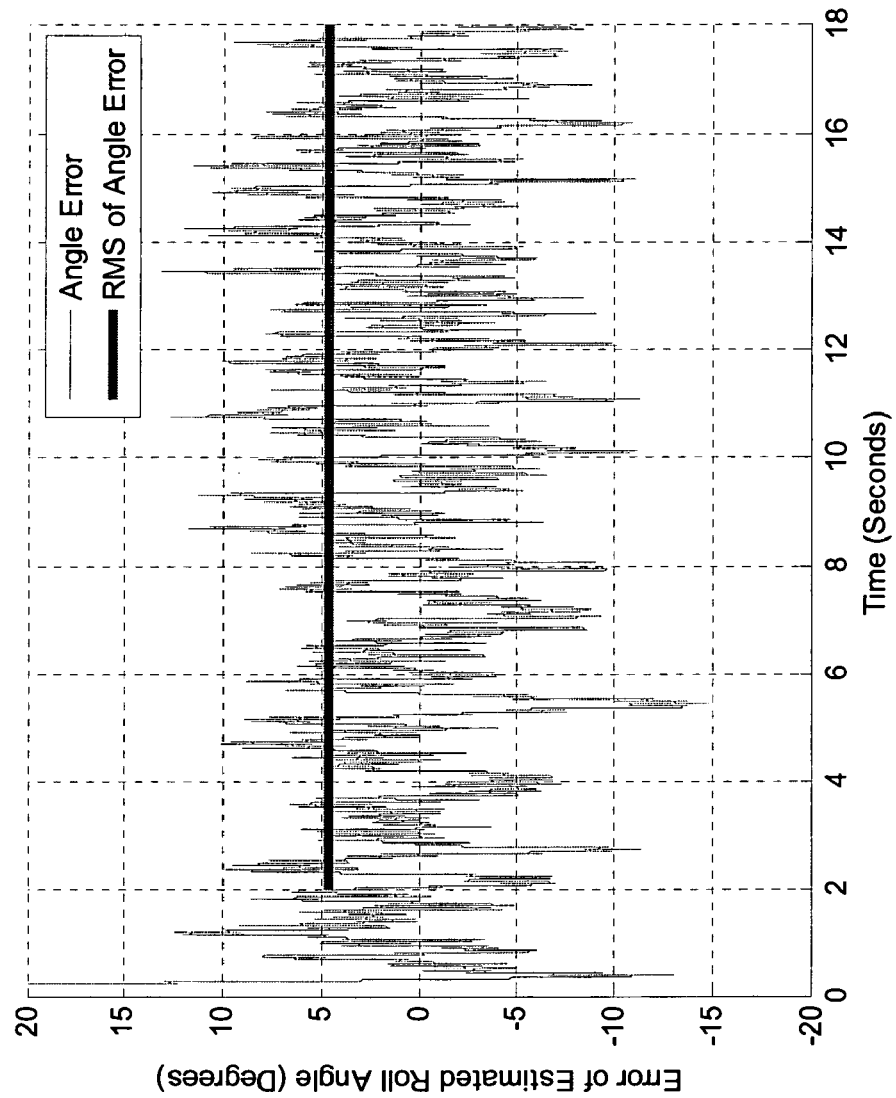
FIG. 11 presents the error in estimated roll angle for a four-antenna array, where the satellite is in the XY plane, the true roll rate is 60 Hz, and the simulation includes ambient thermal noise and 3-dB system noise.
Figure 12:
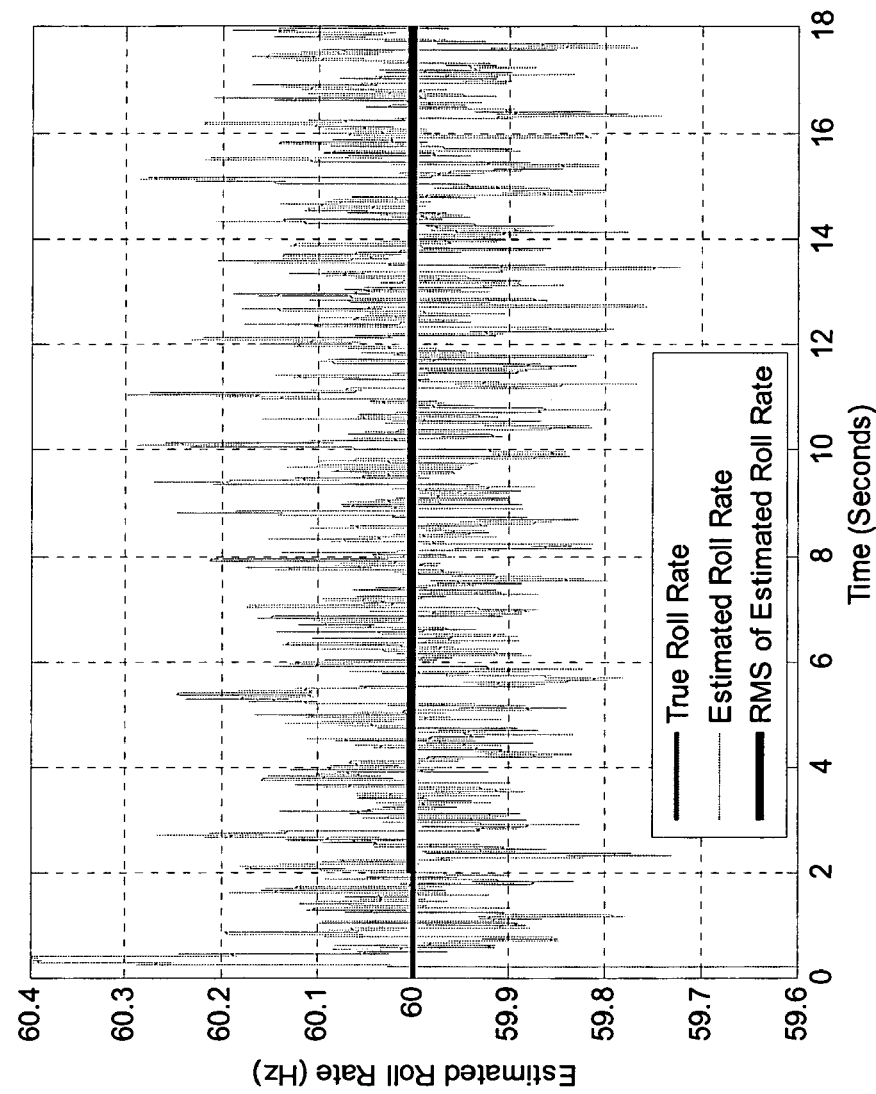
FIG. 12 presents the estimated roll rate for a four-antenna array, where the satellite is in the XY plane, the true roll rate is 60 Hz, and the simulation includes ambient thermal noise and 3-dB system noise.

FIGS. 11 and 12 respectively display the errors in estimated roll angle and the estimated roll rate for a projectile spinning at 60 Hz. All the conditions are the same as in the previous case except that with a lower expected spin rate the coherent integration time interval has been increased to 2 milliseconds. As shown in these figures, the estimated roll angle is typically within ±12° of the true roll angle; the rms error after the initial transient is 4.59°. The estimated roll rate is generally within ±0.25 Hz of the true roll rate; the rms error after the initial transient is 0.09 Hz.

Figure 13:
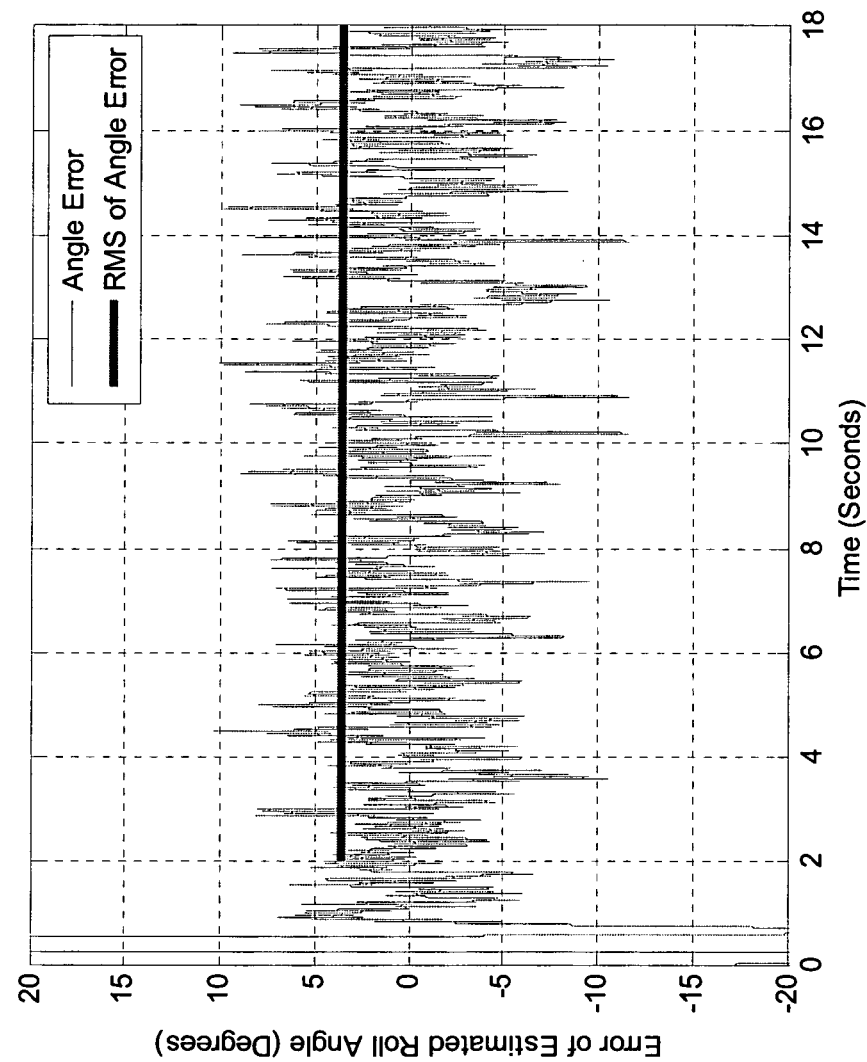
FIG. 13: presents the error in estimated roll angle for a four-antenna array, where the satellite is in the XY plane, the true roll rate is 20 Hz, and the simulation includes ambient thermal noise and 3-dB system noise.
Figure 14:
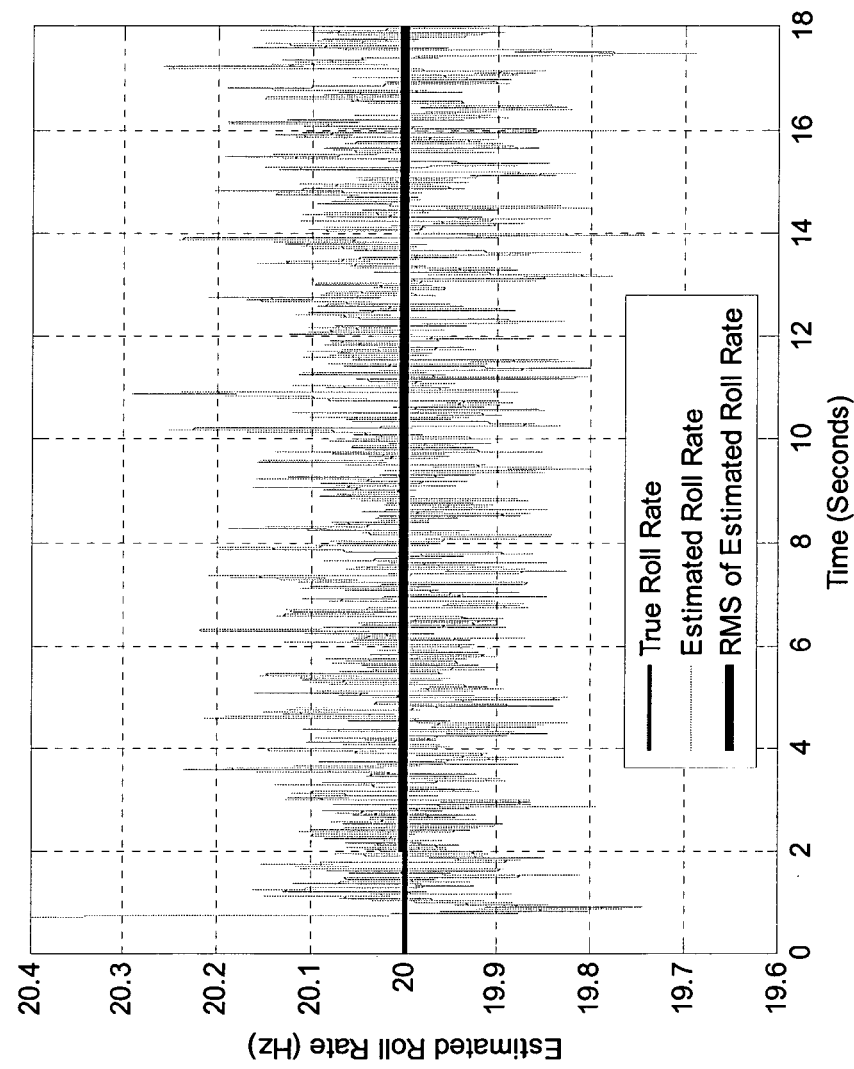
FIG. 14 presents the estimated roll rate for a four-antenna array, where the satellite is in the XY plane, the true roll rate is 20 Hz, and the simulation includes ambient thermal noise and 3-dB system noise.

FIGS. 13 and 14 respectively present the errors in estimated roll angle and the estimated roll rate for a projectile spinning at 20 Hz. All of the conditions in this case are the same as in the previous case designed for 60 Hz spin rate. As shown in these figures, the estimated roll angle is typically within ±10° of the true roll angle; the rms error after the initial transient is 3.58°. The estimated roll rate is generally within ±0.2 Hz of the true roll rate; the rms error after the initial transient is 0.08 Hz.

We claim:

1. A system for determining the roll rate and roll angle of a spinning platform comprising:
    a plurality of antennas for receiving GPS signals from at least one satellite, each antenna outputting an antenna signal for each received signal;
    a signal combiner for receiving the antenna signals and outputting combined antenna signals;
    a GPS receiver processor for forming the navigation solution with the combined antenna signals; and
    a roll processor, for correlating each of the antenna signals separately, measuring the phase differences between the correlated signals from pairs of antennas, and processing the measured phase differences and navigation solution in a roll filter that outputs roll rate and roll angle, said roll filter including roll rate and roll angle as filter state variables.

2. The system of claim 1, wherein the plurality of antennas comprises at least two antennas.

3. The system of claim 1 wherein the plurality of antennas comprises at least three antennas.

4. The system of claim 2, wherein the spacing between the antennas is a fraction of the GPS signal wavelength.

5. The system of claim 2 wherein the roll filter includes a Kalman filter.

6. A system for determining the roll rate and roll angle of a spinning platform comprising:
    a plurality of antennas for receiving GPS signals from at least one satellite, each antenna outputting an antenna signal for each received signal;
    means for receiving the antenna signals and outputting combined antenna signals;
    a GPS receiver processor for forming the navigation solution with the combined antenna signals; and
    means for synchronously correlating each of the antenna signals separately, measuring the phase differences between the correlated signals from pairs of antennas, and processing the measured phase differences and navigation solution to determine roll rate and roll angle.

7. The system of claim 6, wherein the plurality of antennas comprises at least two antennas.

8. The system of claim 6 wherein the plurality of antennas comprises at least three antennas.

9. The system of claim 7, wherein the spacing between the antennas is a fraction of the GPS signal wavelength.

10. The system of claim 6, wherein the means for synchronously correlating the received antenna signals includes driving the correlators using the GPS receiver.

11. The system of claim 7 wherein the means for processing the measured phase differences and navigation solution includes a Kalman filter.

12. A system for determining the roll rate and roll angle of a spinning platform comprising:
a plurality of antennas for receiving GPS signals from at least one satellite, each antenna outputting an antenna signal for each received signal;
signal combiner for receiving the antenna signals and outputting combined antenna signals;
a GPS receiver processor for forming the navigation solution with the combined antenna signals;
at least one non-GPS measurement source for updating the navigation solution; and
a roll processor, for synchronously correlating each of the antenna signals separately, measuring the phase differences between the correlated signals from pairs of antennas, and processing the measured phase differences and updated navigation solution in a roll filter that outputs roll rate and roll angle, said roll filter including roll rate and roll angle as filter state variables.

13. The system of claim 12, wherein the plurality of antennas comprises at least two antennas.

14. The system of claim 13, wherein the spacing between the antennas is a fraction of the GPS signal wavelength.

15. The system of claim 13, wherein the roll filter includes a Kalman filter.

16. The system of claim 13, wherein the non-GPS measurement source is an inertial measurement unit.

17. The system of claim 13 wherein the non-GPS measurement source is a magnetometer.

18. A method for determining the roll rate and roll angle of a spinning platform comprising the steps of:
receiving GPS signals from at least one satellite on a plurality of antennas;
outputting an antenna signal for each received signal;
combining the antenna signals and forming the navigation solution with the combined antenna signals;
correlating each of the antenna signals separately;
measuring the phase differences between the correlated signals from pairs of antennas; and
processing the measured phase differences and navigation solution in a roll filter that outputs roll rate and roll angle, said roll filter including roll rate and roll angle as filter state variables.

19. The method of claim 18, wherein the plurality of antennas comprises at least two antennas.

20. The method of claim 18, wherein the plurality of antennas comprises at least three antennas.

21. The method of claim 19, wherein the spacing between the antennas is a fraction of the GPS signal wavelength.

22. The method of claim 19, wherein the roll filter includes a Kalman filter.

23. A method for determining the roll rate and roll angle of a spinning platform comprising the steps of:
receiving GPS signals from at least one satellite on a plurality of antennas;
outputting an antenna signal for each received signal;
combining the antenna signals and forming the navigation solution with the combined antenna signals;
updating the navigation solution using at least one non-GPS measurement source;
synchronously correlating each of the antenna signals separately;
measuring the phase differences between the correlated signals from pairs of antennas; and
processing the measured phase differences and updated navigation solution in a roll filter that outputs roll rate and roll angle, said filter including roll rate and roll angle as filter state variables.

24. The method of claim 23, wherein the plurality of antennas comprises at least two antennas.

25. The method of claim 23, wherein the plurality of antennas comprises at least three antennas.

26. The method of claim 24, wherein the spacing between the antennas is a fraction of the GPS signal wavelength.

27. The method of claim 24, wherein the roll filter includes a Kalman filter.

28. The method of claim 24 wherein the non-GPS measurement source is an inertial measurement unit.

29. The method of claim 24 wherein the non-GPS measurement source is a magnetometer.

30. The system of claim 3 wherein the pairs of antennas includes adjacent pairs of antennas.

31. The system of claim 30 wherein the adjacent pairs of antennas includes adjacent pairs of antennas that change with platform roll.

32. The system of claim 2, wherein the combined antenna signals include a linear combination of antenna signals.

33. The system of claim 8 wherein the pairs of antennas includes adjacent pairs of antennas.

34. The system of claim 33 wherein the adjacent pairs of antennas includes adjacent pairs of antennas that change with platform roll.

35. The system of claim 7, wherein the combined antenna signals include a linear combination of antenna signals.

36. The system of claim 12, wherein the plurality of antennas comprises at least three antennas.

37. The system of claim 36 wherein the pairs of antennas includes adjacent pairs of antennas.

38. The system of claim 37 wherein the adjacent pairs of antennas includes adjacent pairs of antennas that change with platform roll.

39. The system of claim 13, wherein the combined antenna signals include a linear combination of antenna signals.

40. The method of claim 20 wherein the pairs of antennas includes adjacent pairs of antennas.

41. The method of claim 40 wherein the adjacent pairs of antennas includes adjacent pairs of antennas that change with platform roll.

42. The method of claim 19, wherein the combined antenna signals include a linear combination of antenna signals.

43. The method of claim 25 wherein the pairs of antennas includes adjacent pairs of antennas.

44. The method of claim 43 wherein the adjacent pairs of antennas includes adjacent pairs of antennas that change with platform roll.

45. The method of claim 24, wherein the combined antenna signals include a linear combination of antenna signals.

46. A system for determining the roll rate and roll angle of a spinning platform comprising:
a plurality of antennas for receiving GPS signals from at least one satellite, each antenna outputting an antenna signal for each received signal;
a GPS receiver processor for forming the navigation solution; and
a roll processor, for correlating each of the antenna signals separately, measuring the phase differences between the correlated signals from pairs of antennas, and processing the measured phase differences and navigation solution in a roll filter that outputs roll rate and roll angle, said roll filter including roll rate and roll angle as filter state variables.

47. The system of claim 46, wherein the plurality of antennas comprises at least two antennas.

48. The system of claim 46, wherein the plurality of antennas comprises at least three antennas.

49. The system of claim 47, wherein the antennas are circumferentially disposed on the platform about its spin axis.

50. The system of claim 47, wherein the spacing between the antennas is a fraction of the GPS signal wavelength.

51. The system of claim 47, wherein the roll filter includes a Kalman filter.

52. The system of claim 48 wherein the pairs of antennas includes adjacent pairs of antennas.

53. The system of claim 52 wherein the adjacent pairs of antennas includes adjacent pairs of antennas that change with platform roll.

54. The system of claim 47 wherein the navigation solution is formed with the GPS antenna signals.

55. The system of claim 47 wherein the navigation solution is formed with the GPS antenna signals and data from a non-GPS measurement source.

56. A method for determining the roll rate and roll angle of a spinning platform comprising the steps of:
receiving GPS signals from at least one satellite on a plurality of antennas and outputting an antenna signal for each received signal;
forming the navigation solution;
correlating each of the antenna signals separately;
measuring the phase differences between the correlated signals from pairs of antennas; and
processing the measured phase differences and navigation solution in a roll filter that outputs roll rate and roll angle, said roll filter including roll rate and roll angle as filter state variables.

57. The method of claim 56, wherein the plurality of antennas comprises at least two antennas.

58. The method of claim 56, wherein the plurality of antennas comprises at least three antennas.

59. The method of claim 57, wherein the antennas are circumferentially disposed on the platform about its spin axis.

60. The method of claim 57, wherein the spacing between the antennas is a fraction of the GPS signal wavelength.

61. The method of claim 57, wherein the roll filter includes a Kalman filter.

62. The method of claim 58 wherein the pairs of antennas includes adjacent pairs of antennas.

63. The method of claim 62 wherein the adjacent pairs of antennas includes adjacent pairs of antennas that change with platform roll.

64. The method of claim 57 wherein the navigation solution is formed with the GPS antenna signals.

65. The method of claim 57 wherein the navigation solution is formed with the GPS antenna signals and data from a non-GPS measurement source.

* * * * *